United States Patent [19]

Mahieux

[11] Patent Number: 5,185,800
[45] Date of Patent: Feb. 9, 1993

[54] BIT ALLOCATION DEVICE FOR TRANSFORMED DIGITAL AUDIO BROADCASTING SIGNALS WITH ADAPTIVE QUANTIZATION BASED ON PSYCHOAUDITIVE CRITERION

[75] Inventor: Yannick Mahieux, Begard, France

[73] Assignee: Centre National d'Etudes des Telecommunications, Issy les Moulineaux, France

[21] Appl. No.: 902,430

[22] Filed: Jun. 24, 1992

Related U.S. Application Data

[63] Continuation of Ser. No. 593,983, Oct. 9, 1990.

[30] Foreign Application Priority Data

Oct. 13, 1989 [FR] France ............................ 89 13649

[51] Int. Cl.⁵ .............................................. G10L 5/00
[52] U.S. Cl. ..................................... 381/29; 381/30; 381/45
[58] Field of Search .................... 381/29–45; 395/2

[56] References Cited

U.S. PATENT DOCUMENTS

4,415,767 11/1983 Gill et al. .............................. 381/45
4,896,362 1/1990 Veldhuis et al. ....................... 381/30

OTHER PUBLICATIONS

Schroeder, M. R., *Optimizing digital speech coders by expoliting masking properties of the human ear*, J. Accoust. Soc. Am., vol. 66, No. 6, Dec. 1979, pp. 1647-1652.
Johnston, J. D., *Transform Coding of Audio Signals Using Perceptual Noise Criteria*, IEEE Journal on Selected Areas in Communications, vol. 6, No. 2, Feb. 1988, pp. 314-323.
Johnston, J. D., *Estimation of Perceptual Entropy Using Noise Masking Criteria*, IEEE (CH2561), Sep. 1988, pp. 2524-2527.
Zwicker, E., *Subdivision of the Audible Frequency Range into Critical Bands (Frequenzgruppen)*, J. Accoust. Soc. Am., vol. 33, No. 2, Feb. 61, p. 248.
Zwicker, E. and Terhardt, E., *Analytical Expressions for Critical-Band Rate and Critical Bandwidth as a Function of Frequency*, J. Acoust. Soc. Am., vol. 68, No. 5, Nov. 1980, pp. 1523-1525.

*Primary Examiner*—Emanuel S. Kemeny
*Attorney, Agent, or Firm*—Kenyon & Kenyon

[57] ABSTRACT

A device for compressing a digital audio signal, includes a device for allocating bits available for the transmission or storage of the signal, controlling means for the adaptive quantization of the signal, in order to enable a major reduction in the bit rate while at the same time preserving the quality of the starting signal to the maximum extent. The device includes means for allocating a specific number of bits for the expression of the coefficients of each frequency band of a transformed digital audio signal, as a function of a piece of auxiliary information corresponding to a description of the spectrum of the signal, said device being informed by means for the prior elimination of spectral components of said transformed signal as a function of a psychoauditive criterion.

19 Claims, 7 Drawing Sheets

BIT ALLOCATION DEVICE FOR TRANSFORMED DIGITAL AUDIO BROADCASTING SIGNALS WITH ADAPTIVE QUANTIZATION BASED ON PSYCHOAUDITIVE CRITERION

This application is a continuation of application Ser. No. 07/593,983, filed on Oct. 9, 1990.

BACKGROUND OF THE INVENTION

1. Field of the Invention

The field of the invention is that of the compression of digital audio signals. The invention can be applied notably to the transmission of sound signals on digital channels as well as to devices for the storage of digital sound signals.

More precisely, the invention concerns a bit allocation device enabling an adaptive quantization of a digital audio signal, after this signal has been transformed into the frequency domain and cut up into frequency bands.

The invention may be implemented, for example, in direct satellite broadcasing systems such as those developed in the European DAB (Digital Audio Broadcasting) project, or again in ISDN broadcasting and high fidelity distribution systems. It can also be applied notably to storage devices such as digital disks.

Digital audio signals have many advantages over analog signals, notably as regards the fidelity of the sound, the preservation of the initial quality and flexibility of use. However, the bit rate resulting from the conversion of the audio signals into digital form is very high, especially for high quality signals, the bandwidth of which is greater than 15 kHz.

It is then necessary to use bit rate reduction techniques.

2. Description of the Prior Art

In a known and widespread way, the techniques used employ algorithms for the mathematical transformation of the source digital audio signal. The transform coding techniques have been extensively applied to the fields of images or of speech. Since very recently, they are also applied to the processing of audio (chiefly musical) signals.

In existing coders implementing these techniques, the signal is first of all cut up into temporal blocks, and is then subjected to a time/frequency transformation. It is the coefficients of the transformed blocks that are encoded and transmitted. At the decoder, a reverse transformation delivers the decoded and reconstructed signal.

The application of mathematical transformation achieves a concentration of the energy of the source signal on the biggest coefficients, and thus enables a reduction of the bit rate by controlling the auditive degradation and reducing it to the minimum, notably by the selective elimination of certain of the transformed coefficients. Indeed, the fact of working in the frequency domain contributes towards taking account of perceptual and psychoauditive properties that are mainly linked to the spectral nature of the sound. The taking into account of the psychoauditive criteria in most existing devices is based on the analysis by ZWICKER in *Psychoacoustique* (Psychoacoustics), Masson, 1981, based on the concept of the masking of inaudible spectral components.

The known devices made on the basis of these principles differ from one another in certain preferences as regards their designing:

the transmission or non-transmission of a piece of auxiliary information (side information) to the main information;

the use or non-use of techniques overcoming the effect of transmission disturbances;

the techniques of taking account of the psychoauditive criteria to achieve the bit rate reduction and the localization of their implementation in the signal coding and decoding chains;

Thus, in a first known device of this type, as described in the French patent document No. 89 06194, "Procédé et installation à codage des signaux sonores" (Sound Signal Coding Method and Equipment) filed on behalf of the present Applicants, the following are implemented successively: the cutting up of the sound signal into blocks of samples, the time/frequency transformation and a predictive and adaptive coding of the most significant coefficients of each block, using a stationarity of the signal. In this device, the auxiliary information is transmitted during transition blocks, thus making it impossible to take account of an inter-block correlation. In all the other situations, this auxiliary information is used solely to control the bit allocation module supplying the main signal quantizer. This device enables a reduction in the bit rate. However, it leads to a chain degradation of the reconstitution of the blocks received when an error occurs, because this error gets passed on to the next block, and so on and so forth, through the loop for preparing the auxiliary information controlling the bit allocator and the quantizer of the decoder.

There are also known devices in which a piece of auxiliary information is transmitted for each block, by adaptive coding. Such a device is described, for example, in the article by Bochow, "Multiprocessor Implementation of an ATC Audio Codec" (Acts of the ICASSP Congress 1989, Glasgow). A drawback of this device is that the continuous coding of the auxiliary information calls for a high bit rate, to the detriment of the bit rate allocated to the main information.

The document by Johnston, "Transform Coding of Audio Signals Using Perceptual Noise Criteria", IEEE Journal on Selected Areas in Communication", Vol. 6, No. 2, February 1988, pp. 314–323, has a bit reduction device using adaptive quantization, with application of the masking thresholds according to Zwicker's analysis in the form of a prediction algorithm applied at the quantizer of the main signal. This algorithm seeks to minimize the noise-to-masking threshold ratio. Just as in Bochow's device, the auxiliary information is transmitted continuously. Furthermore, this device has a variable length coding or Huffman coding at output of the quantizer, which is quite complicated to apply.

The invention is aimed at overcoming the drawbacks of these different known devices.

SUMMARY OF THE INVENTION

More precisely, the aim of the invention is to provide a device for the compression of a digital audio signal, by using a device for the allocation of bits available for the transmission or storage of the signal, controlling means for the adaptive quantization of the signal, in order to enable a major reduction in the bit rate while, at the same time, preserving the quality of the starting signal to the maximum extent.

Another aim of the invention is to provide a bit allocation device such as this, wherein the principle of operation takes account of psychoauditive criteria.

Another aim of the invention is to minimize the chain degradation phenomena at the reconstruction of the signal when a disturbance that generates errors or interference occurs in the transmission channel.

A complementary aim of the invention is to provide, in one of the advantageous embodiments of the invention, a principle for the joint transmission of main information and auxiliary information by optimizing the bit rate of the auxiliary information and then that of the main information.

It is also the aim of the invention is to enable the use of a fixed number of bits for the coding of each block of information.

These aims, as well as others that shall appear here below, are achieved by means of a bit allocation device, of the type that enables the control of means to quantize the compression of a transformed digital audio signal, designed to be transmitted through a channel with a limited bit rate or to be stored on a medium of digital information, wherein the allocation consists notably in the assigning, to each band in a set of adjacent bands covering the totality of the spectrum of the transformed signal, of a number of specific bits for the expression of the transformed coefficients of said signal, as a function of an auxiliary information corresponding to a description of the spectrum of said transformed signal, said device being informed by means for the prior elimination of spectral components of said transformed signal as a function of a psychoauditive criterion.

This elimination of spectral components to prepare the auxiliary information enables an a priori optimization of the quantization operation.

Advantageously, said device includes (in a known way) means for computing the masking threshold of spectral components on the basis of a psychoauditive criterion, to optimize the allocation of the bits in each of said bands.

Preferably, said psychoauditive criterion works according to Zwicker's psychoauditive masking criterion.

According to a major characteristic of the invention, said means of quantization include at least two distinct quantizers and means for the selective assigning of one of said quantizers to each of said bands of the spectrum of said transformed signal as a function of the number of components preserved in said band, after said elimination of the masked coefficients.

In a preferred embodiment of the invention, said device includes means for minimizing a quantization noise-to-masking threshold ratio in each of said bands.

Advantageously, said quantization noise is determined as a function of at least one of the three pieces of information belonging to the group including:

the standard deviation of said spectral components not eliminated in said band;

a performance factor of said quantizer selected for said band;

a piece of information on the spectral spread of said band.

According to another characteristic of the invention, said piece of information given by said means for the prior elimination of spectral components is prepared by run length coding means for the coding of the indices of said masked spectral components.

Preferably, said run length coding means use a variable length code of the Huffman codes type.

According to an advantageous characteristic, said run length coding means deliver a specific code word for the coding of the frequency bands all the said components of which are eliminated.

Advantageously, said run length coding means are activated by selection means, as a function of a piece of information on bit rate gain provided by said coding.

According to another major characteristic of the invention, said device cooperates with means for coding said auxiliary information corresponding to the description of the spectrum.

In this way, it is possible to permanently transmit an auxiliary piece of information without thereby causing major adverse effects on the main information bit rate.

Preferably, said coding means include predictive coding means.

Thus, the risks of chain degradation are eliminated as regards the main information. This degradation can occur, in the invention, only on the auxiliary information.

Advantageously, said predictive coding means include means belonging to the group comprising the logarithmic conversion means, the differential MIC coding means and the means for coding by variable length codes of the Huffman codes type.

Preferably, said coding means also include means for inter-block coding without memory, said predictive coding means and said means for coding without memory being selected according to a pre-determined criterion.

Advantageously, said pre-determined criterion is a least bit rate criterion and/or a criterion for minimizing the effect of transmission errors.

According to an advantageous characteristic of the invention, at least one of the pieces of information belonging to the group including said auxiliary information corresponding to the description of the spectrum, said information given by said means for eliminating the inaudible components and a piece of information on spectral spread is transmitted or stored jointly at each of the main information blocks.

According to another characteristic of the invention, said transformed digital signal is prepared by tranform coding means using a transform of the Princen and Bradley type of modified discrete cosine transform.

Advantageously, said transform coding means including means for the tapered windowing of the temporal signal bringing out a symmetry in said transformed signal.

Preferably, said windowing means use a window defined by:

$$F(n) = 2 \cdot \sin(\pi(n + 0.5)/N)$$
$$n = 0, \ldots, N - 1$$

where N is the number of samples of said window.

BRIEF DESCRIPTION OF THE DRAWINGS

Other characteristics and advantages of the invention will appear from the following description of a preferred embodiment of the invention, given as a nonrestrictive example, and from the appended drawings.

DETAILED DESCRIPTION

Figure 1:
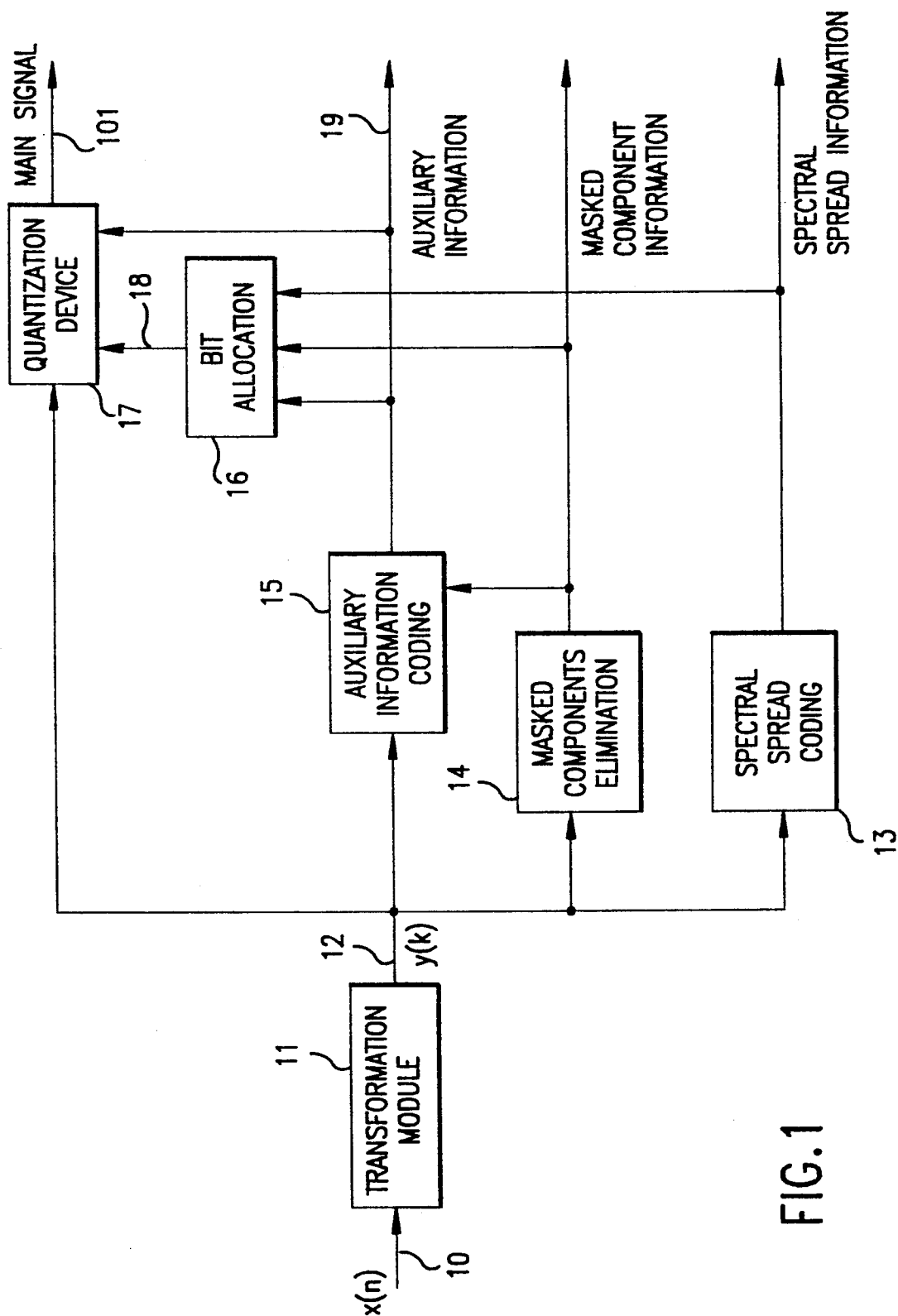
FIG. 1 is a block diagram of the digital audio signal coding device, including a bit allocation device according to the present invention.

The device of FIG. 1 enables the coding of digital audio data according to the method of the present invention. The input signal x(n) 10, sampled at a frequency greater than or equal to 32 kHz, is applied to the transformation module 11. The sampling frequency corresponds to that used for high fidelity sound.

A preferred embodiment of the transformation module 11 advantageously uses the transform devised by Princen and Bradley, ("Adaptive Transform Coding Incorporating Time Domain Aliasing Cancellation", in *Speech Communication*, December 1987), also known as the modified discrete cosine transform (MDCT). This transform corresponds to a projection on a cosine base. The transform coefficients are defined by:

$$y(m,k) = \sum_{n=0}^{N-1} x_m(n) \cdot h(N - 1 - n) \cdot \cos(2\pi(k + \tfrac{1}{2})(n + n_0)/N)$$

$$k = 0, \ldots, N - 1.$$

with:

N: size of the transform block
h(n): block weighting window
m: block transform number.

Its chief advantage is related to the fact that it permits the use of high-performance weighting windows h(n) on the spectral plane, thus achieving excellent separation of the transform channels. The concentration of energy is then higher than with the discrete Fourier transform (DFT) for example, and the coefficients to be coded are very close to the true spectrum.

Before being transformed, the block of temporal samples is weighted by a window h(n). A "tapered" window, for example a sinusoidal window is used, defined by: $h(n) = 2 \sin(\pi(n+0.5)/N)$, n varying from 0 to $N-1$, N being the number of samples per temporal block. The MDCT used works in perfect synergy with this type of tapered window. Indeed, this type of window can be used to obtain N/2 single coefficients after tranformation, the N/2 other coefficients being identical, except for the sign. On the contrary, a rectangular window would lead to a spectral spread with respect to the original signal. Since its application further calls for an inter-block overlapping equal to 50% of the size of the blocks, the number of transformed coefficients is identical to the original number of samples of the source signal to be transmitted to each block. This inter-block overlapping is necessary to enable the perfect reconstruction of the signal.

The coefficients y(k) 12 leaving the tranformation module 11 are then presented at the inputs of the various coding modules 13, 14, 15, 16, 17.

A first block carries out, first of all, the elimination of the inaudible spectral components in the transformed signal 12.

This operation of elimination is based, for example, on Zwicker's analysis as described in detail further below. This analysis makes it possible to distinguish masked lines, corresponding to inaudible frequencies, in an audio signal. The transform coefficients corresponding to these inaudible components are not transmitted.

Since the MDCT is characterized by good frequency separation, the number of lines eliminated may be great. The result thereof is a significant reduction in the number of values to be transmitted. Furthermore, since these untransmitted coefficients are generally of a low level, the quantizers used for the transmitted coefficients may be optimized accordingly.

The module for eliminating the masked lines 14 is more precisely described further below, with reference to FIG. 2.

The spectral lines kept, given at the output of the module 14, form inputs into the module 15 for the computation and coding of the auxiliary information. The auxiliary information generated by the module 15 is computed by frequency bands of unequal widths and may be coded by two different modes. If the signal is stationary, the coding takes place with respect to the preceding blocks (the interframe correlation is taken into account), otherwise the current block is a transition block and the coding takes place without taking account of the inter-block memory.

These coding means are described with greater precision further below, with reference to FIG. 3.

The outputs of the module 14, for the elimination of the masked lines, and of the module 15, for computing and coding the auxiliary information, supply the bit allocation module 16 controlling the quantizer 17. The output of the bit allocation block 16 gives a piece of information 18 on the number of bits R available for the expression of each of the coefficients y(k) of the transformed signal 12. This bit allocation is dynamic: it varies from one block to the next one. Moreover, it is designed to provide for the masking of the quantization noise.

The bit allocation module 16 also has, for its input, the values of the spectral spread function measured in frequency bands given by a module 13 for the computing and coding of the spectral spread, on the coefficients of the transformed signal 12. This enables the nature of the spectrum, notably the fact of whether it is highly concentrated or not, to be characterized.

The working of the bit allocation module 16 is developed further below.

Finally, the coefficients y(k) of the signal 12 are quantized in the module 17 according to the piece of information 18 on the allocated number of bits R. Furthermore, according to a major characteristic of the invention, the piece of information 19 obtained at output of the coder 15 of the auxiliary information as well as the information on the elimination of the masked lines coming from the module 14 enable the choice, for the current block, of one among several available quantizers, as shall be seen hereinafter.

The decoding is done in a manner that is quite symmetrical with the coding.

Figure 2:
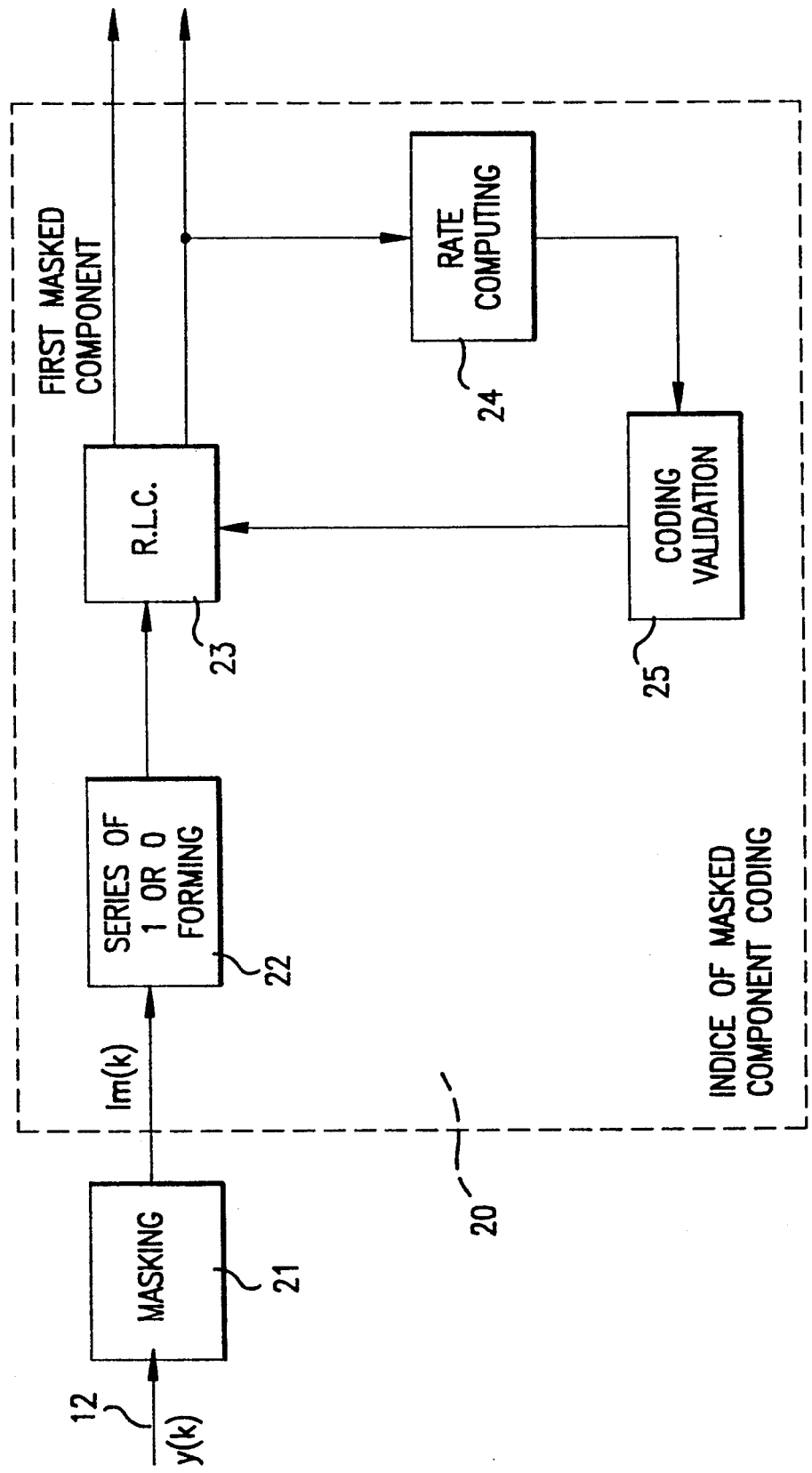
FIG. 2 is a functional diagram of the module for the elimination of masked lines.

FIG. 2 shows the functional diagram of the masked line elimination module 14.

The function of this module is to eliminate the lines that are inaudible because of masking phenomena, so that only perceptually useful information is transmitted.

This procedure is particularly useful for wide spectrum sounds, rich in harmonics. A large number of coefficients is then masked. It is precisely this type of signal that requires a higher bit rate, because of the quantity of information to be transmitted.

Figure 5:
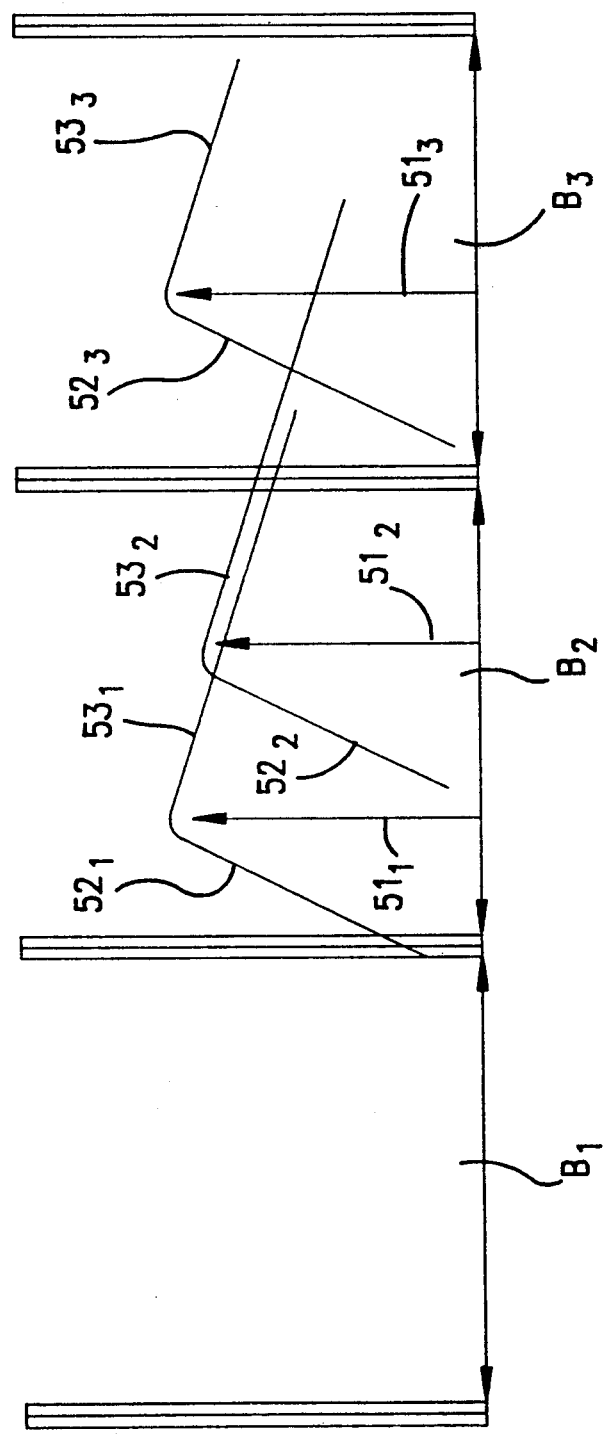
FIG. 5 is a diagram illustrating the principle of elimination of the masked lines according Zwicker's analysis.

This device includes a masked line detection module. This detection concerns the real spectrum and is done only by a coder. It makes use of the frequency masking curves, according to Zwicker's analysis. As shown in FIG. 5, it would appear that, for each line 51 transmitted, the lines that are beneath a line 52 of −25 dB per critical band upstream of the line and beneath a line 53 of −10 dB per downstream critical band, are inaudible. These two slopes correspond respectively to the anterior and posterior frequency maskings.

The spectrum is divided into 24 critical bands, $B_1$, $B_2$, $B_3$ and multiplied by the ear transmission factor $a_o$ for each of said bands.

The computation of the masking threshold is separated into "critical intraband" masking and "critical inter-band" masking.

The intra-band masking corresponds to the total masking effect of all the lines $51_1$, $51_2$ within one and the same band $B_2$. The intra-band masking threshold is computed by summation of the contribution of each coefficient y(k) of the transformed signal.

If we consider the critical band j, demarcated by $b_b(j)$, the lower limit, and $b(j)$, the upper limit, the contribution of the coefficient y(k) to the intra-band masking threshold $s_{in}(j)$ is given by:

$$s_{in}^k(i) = \theta \cdot (y(k)^2 \cdot a_o(j))$$

with $b_b(j) \leq i \leq k-3$ and $k+3 \leq i \leq b_h(j)$
where $\theta$ is a constant shift corresponding to −30 dB.

As can be noted, each coefficient y(k) does not affect the masking threshold of the four nearest coefficients. This precaution is necessary to prevent untimely zero-settings that might occur around peaks of the spectrum.

The masking threshold is finally obtained by summation of the $s_{in}^k(i)$:

$$s_{in}(i) = \sum_{i=b_b(j)}^{b_h(j)} s_{in}^k(i)$$

with $b_b(j) \leq i \leq b_h(j)$ and $j = 1, \ldots, 24$.

The inter-band masking results from the taking into account, in each band $B_2$, of the masking effect of the adjacent bands. In fact, only the posterior masking (that of the lines $51_3$ of the band $B_2$) is considered for the computation of the inter-band masking threshold. The anterior masking (band $B_1$) is too low to substantially modify the number of masked lines per block (−25 dB per critical band instead of −10 dB).

The contribution $s_{out}^j(i)$ of each critical band j to the masking of the following bands (i > j) is computed by:

$$s_{out}^j(i) = \theta \cdot \left( \sum_{k=b_b(j)}^{b_h(j)} y(k)^2 \cdot a_o(j) \right) \cdot (1/10)^{i-j}$$

$$i = j + 1, \ldots, 24$$

The total inter-band masking, for the critical band i, is equal to:

$$s_{out}(i) = \sum_{j=1}^{i-1} s_{out}^j(i)$$

Finally, for the coefficient y(i), of the critical band j, the final masking threshold is obtained by summation:

$$s(i) = s_{in}(i) + s_{out}(j).$$

The energy of the coefficient y(i), multiplied by the transmission factor $a_o(j)$ is then compared with the masking threshold thus defined. If $a_o(j) \cdot y^2(i) < s(i)$, the coefficient y(i) is supposed to be masked.

This function is fulfilled by the sub-module 21 of FIG. 2. This figure gives a detailed view of the main constituent sub-modules of the masked line eliminating module 14 of FIG. 1.

Advantageously, the detection of the masked lines in the sub-module 14 is followed by a coding of the indices of the masked lines, done by the block 20. This coding is necessary to indicate the numbers of the masked coefficients to the decoder and uses, for example, the run length coding technique.

Let $I_m(k)$ be a bit equal to 1 if the coefficient y(k) is masked. The series $\{I_m(k), k=0, \ldots, N/2\}$ has uninterrupted runs of 0 and 1, of varying length, formed in a sub-module 22. It is the length of the runs that are transmitted by means of a variable length code 23. If very many lines of the same state follow one another without discontinuity, then the bit rate to be allocated to this auxiliary information may be low.

The variable length coding of the sub-module 23 is done advantageously by a Huffman code computed from a density of experimental probability.

The coding of the runs starts only from the first masked line onwards. The number of this masked line is transmitted on 9 bits.

At the coder, the run length coding consists simply in making a search for all the runs of 0 and 1 and in associating the corresponding Huffman code word with them.

The length of the runs is limited to maximum values: 64 coefficients for the 0 runs and 128 coefficients for the 1 runs. If these limits are exceeded, a run having zero length and the reverse state is transmitted. With this zero length run, there is associated a Huffman code word which is itself also computed (outside the line) after the occurrence of the run.

At the decoder, after reception of the first masked line, it is enough to decode the Huffman codes. The runs of codes of lengths 0 and 1 enable the series $\{I_m(k)\}$ to be reconstituted exactly.

If the runs of 0 and 1 are greatly fragmented, the auxiliary information bit rate may be high. For a small number of masked lines, the gain of their non-transmission may be zero, or even negative. It would then be appropriate not to proceed with this non-transmission or, at least, to restrict it to certain frequency zones.

To this end, the mean number of bits per coefficient is computed in both the following cases:
transmission of all the coefficients:

$$R_1(k) = (R_0 - R_{ifs})/(N/2)$$

where $R_0$ is the total number of bits per block,
$R_{ifs}$ is the number of bits necessary for the transmission of the auxiliary information describing the spectrum. $R_{ifs}$ is actually the value of the preceding block.

non-transmission of the masked lines by the use of run length coding:

$$R_2(k) = (R_0 - R_{ifs} - R_{im})(N/2 - N_{rm})$$

where $R_{im}$ is the auxiliary bit rate of the run length coding,
$N_{rm}$ is the number of masked lines.

The non-transmission of the masked lines is done for the entire band considered if the test and bit rate computing sub-module 24 establishes that:

$$R_{im} < N_{rm} \cdot (2(R - R_{ifs})/N).$$

If this condition is not met, this test is done in four frequency sub-bands of the band considered, having equal widths. during the search for the 0 and 1 runs, the "local" values $R_{im}(l)$ and $N_{rm}(l)$ ($l = 1, \ldots, 4$) are computed.

If $R_{im}(l) < N_{rm}(l) \cdot (2(R_0 - R_{ifs})/N)$, that is, if the gain in bits is positive for the frequency sub-band 1 considered, the run length coding is applied to the coefficients of this sub-band 1.

If not, the coefficients of this band are considered to be non-masked and the index of the first coefficient enforced to 0 is modified accordingly.

The coding validation sub-module 25 controls the variable length coding sub-module 23, depending on whether or not it is necessary to to perform the coding.

The mean auxiliary bit rate is of the order of 0.8 bits per masked line. This low value proves that it is worthwhile to use run length coding.

Figure 3:
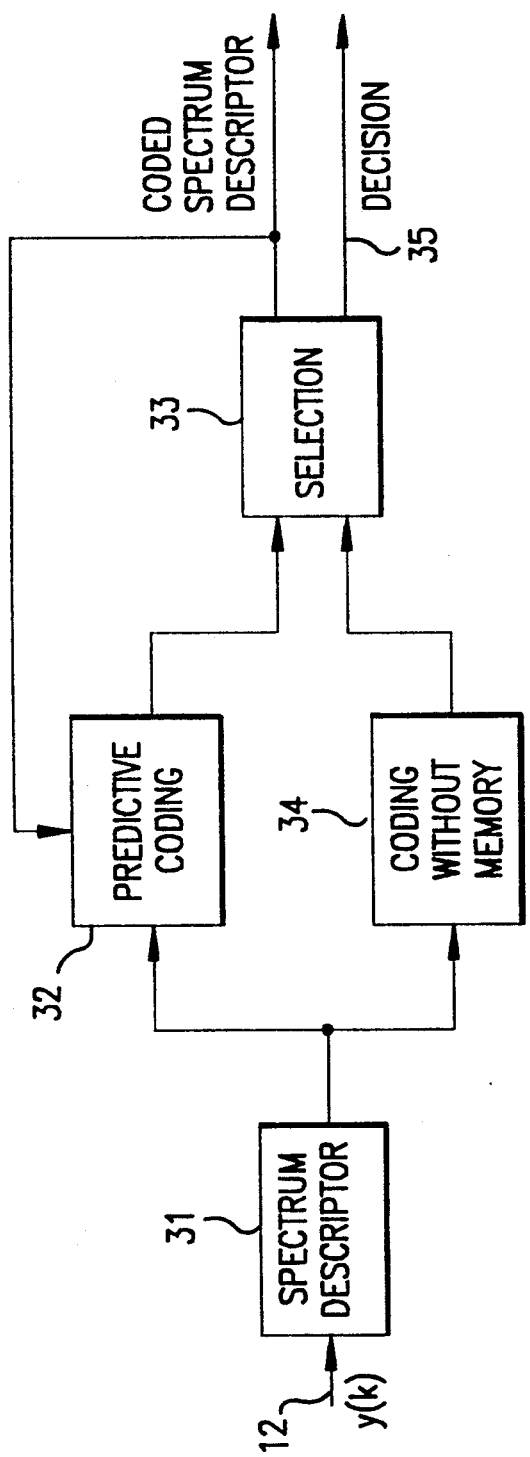
FIG. 3 shows a detailed functional diagram of module for computation and coding of the auxiliary information.

FIG. 3 shows the detailed functional diagram of the module 15 for the computation and coding of the auxiliary information.

The transmission of a piece of auxiliary information is necessary to compute the bit allocation and to quantize the coefficients. This auxiliary information 19 is actually a variably precise descriptor of the spectrum of the signal.

In the embodiment described, the spectrum descriptor is computed in a sub-module 31 in frequency bands of unequal length. The spectrum is divided, for example, into 50 frequency groups.

The limits $b_{si}^b(j)$ and $b_{si}^h(j)$ of these bands are in keeping with those of the critical bands. The narrowest bands ($j = 1, \ldots, 14$) have the same width as the corresponding critical bands. The other bands having an increasing width which reaches 562.5 Hz (i.e. 18 coefficients) for the last band ($j = 50$).

The spectrum descriptor used $\sigma(j)$ is equal to the standard deviation of the non-masked spectral lines in each of the bands $$\sigma^2(j) = (1/N_{si}(j)) \cdot \sum_{b_{si}^b(j)}^{b_{si}^h(j)} y^2(k)$$

with $j = 1, \ldots, 50$ $N_{si}(j)$ is the number of non-masked coefficients in the band j.

The originality of the coding of this information, according to the invention, lies in the fact that the correlation existing between the successive transform blocks is taken into account by means of a predictive coding. Thus the coder derives advantage from all the correlations of the signal (in the short term and in the longer term).

The coding of the auxiliary information is usually done without taking account of the perceptual properties, unlike in the case of the quantization of the coefficients. It is necessary, however, to reserve the greatest number of bits possible for the bit rate of the main signal 101, and hence to reduce the bit rate of the auxiliary information 19.

A direct coding of the components of the spectrum descriptor $\sigma(m,j)$ (m = block number) calls for a high bit rate. However, since the signals are generally highly stationary, the spectrum descriptor is highly correlated from one block to the next one.

The most direct way to benefit from this stationary quality is to carry out a predictive coding 32. Owing to the great spectral dynamic range, it is preferable to apply the prediction to to $\sigma(m,j)$ expressed in dB. Indeed, it is the ratio $\sigma(m,j)/\sigma(m-1,j)$ rather than the difference $\sigma(m,j) - \sigma(m-1,j)$ that has a high predictive gain.

Figure 4:
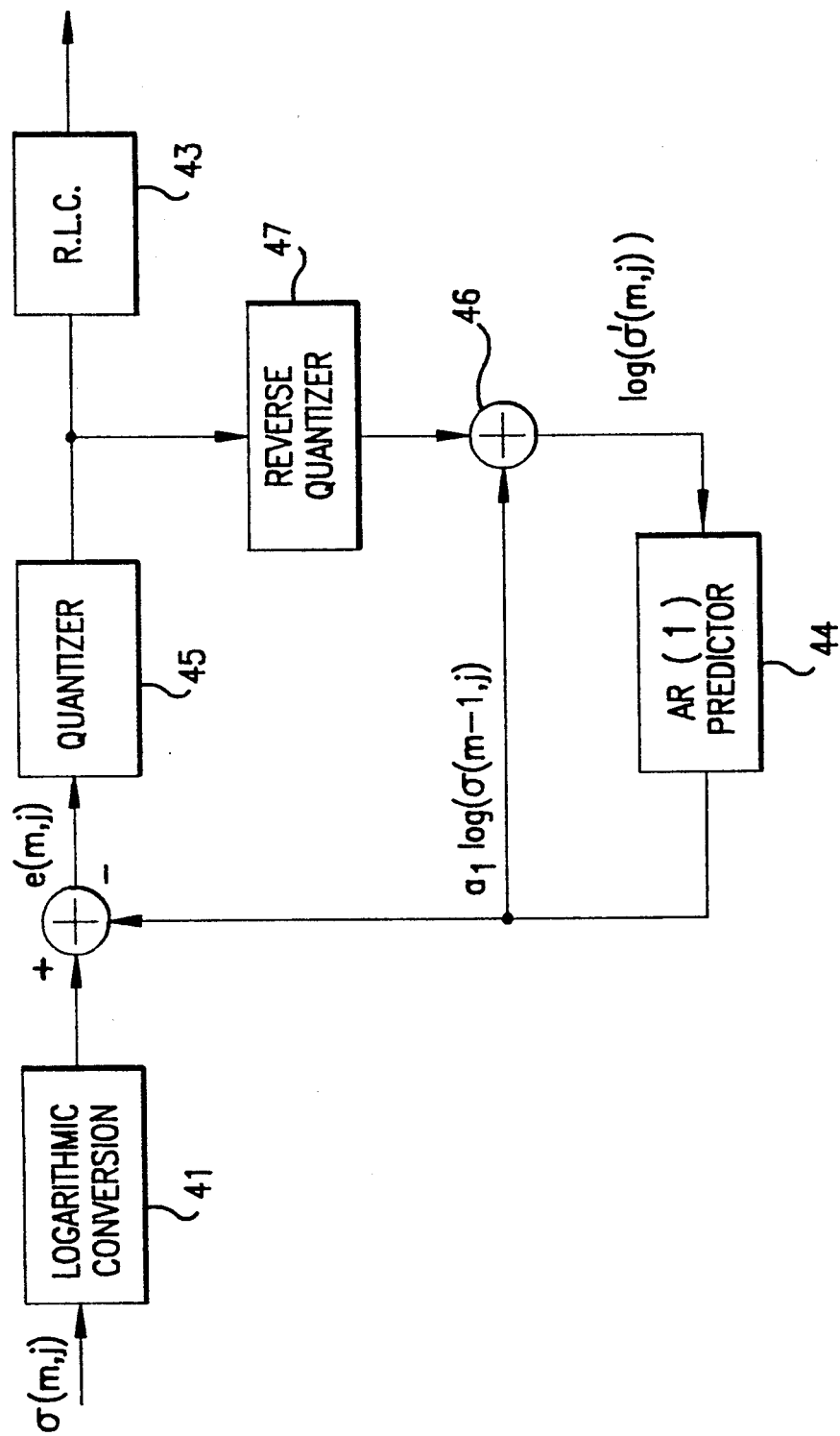
FIG. 4 is a functional diagram of the module for predictive coding of the auxiliary information.

As shown in FIG. 4, this predictive coding has an operator 41 for conversion into a logarithmic scale followed by a Differential MIC Code and a variable length coding device 43.

The prediction is done by a first-order predictor 44. The coefficient of prediction $a_1$ may take a value between 0.95 and 1. The input of this predictor 44 is the previous quantized value log $(\sigma'(m,j))$.

The prediction error $$e(m,j) = \log(\sigma(m,j)) - a_1 \cdot \log(\sigma'(m-1,j))$$

with $j = 1, \ldots, 50$ is quantized by a uniform quantizer 45 having, for example, 32 levels for a dynamic range of $[-2, 2]$.

Since the signal is stationary for lengthy periods, the density of probability of the code words at output of the quantizer 45 is highly concentrated. As a consequence, these code words undergo a variable length coding 43 (Huffman coding) which enables the bit rate of transmission of the spectrum descriptors to be reduced to about 2.5 bits per value $\sigma'(m,j)$.

The value log $(\sigma'(m,j))$ is obtained by the summation 46 of the value given by a reverse quantizer 47, corresponding to the value that will be obtained at the decoding, and of the previous value coming from the predictor 44.

If a frequency band is entirely masked ($N_{si}(j) = 0$), it is not necessary to transmit a code word for the band j. Indeed, the value of $\sigma(m,j)$ is, in this case, known to the decoder by means of the information concerning the masked lines.

However, to prevent a transmission error on the bits I(m,k) from being passed on to the values $\sigma'(m,j)$, a redundancy is deliberately introduced into the coding: if $N_{si} = 0$, a specific code word is transmitted, computed as a function of its occurrences, like the other code modes.

Thus, when the band ceases to be entirely masked, the prediction relates to the last non-transmitted non-zero value $\sigma'(m-p,j)$.

During the spectral transitions (non-stationarity of the signal), this quantization procedure is no longer valid for it demands an excessively high bit rate to keep the same precision of quantization. It is then necessary to make use of a coding without memory of $\sigma(m,j)$, applied in the sub-module 34.

This second coding 34 is similar to the preceding one. The prediction takes place frequentially instead of being done on successive transform blocks. The prediction error is computed by:

$$e(m,j) = \log(\sigma(m,j)) - \log(\sigma'(m,j-1)).$$

$e(m,j)$ is coded by a uniform quantizer having, for example, a dynamic range of 100 dB and 50 levels of quantization. The code words at output also undergo a Huffman coding.

The first value of $\sigma(m,1)$ is transmitted separately.

A module 33 for 94 choosing the type of coding selects the best coding according to the number of bits expended. If the bit rate necessary for the interframe coding exceeds a threshold fixed beforehand, the second type of coding 34 is used. This choice is transmitted to the decoder by means of a decision bit.

It is also possible to take account, for the selection of the type of coding, of another criterion than that of the minimization of the bit rate. It is possible, for example, to act so as to minimize the effect of the transmission errors.

The predictor 44 is a first order auto regressive predictor (AR(1)), with a prediction coefficient close to 1. Consequently, there is a risk that the transmission errors might get propagated indefinitely. Since the auxiliary information has a major importance, inter alia for the allocation of the bits, it is necessary to reinitialize the inter-frame coding. To this effect, for all the blocks of a rank that is a multiple of 16, inter-block coding without memory is used, even if the signal is stationary.

The coefficients y(k) 12 are coded by means of non-uniform adaptive quantizers. The adaptation is done by the quantized spectrum descriptor $\sigma'(m,j)$, where j is the number of the band to which y(k) belongs.

Each value $\sigma'(m,j)$ represents a variable number, $N_{si}(j)$, with non-zero coefficients, because of the variable width of the frequency bands and of the device for detecting the masked lines. The performance values of the quantizers vary as a function of the number of coefficients to be quantized $N_{si}(j)$.

Figure 6:
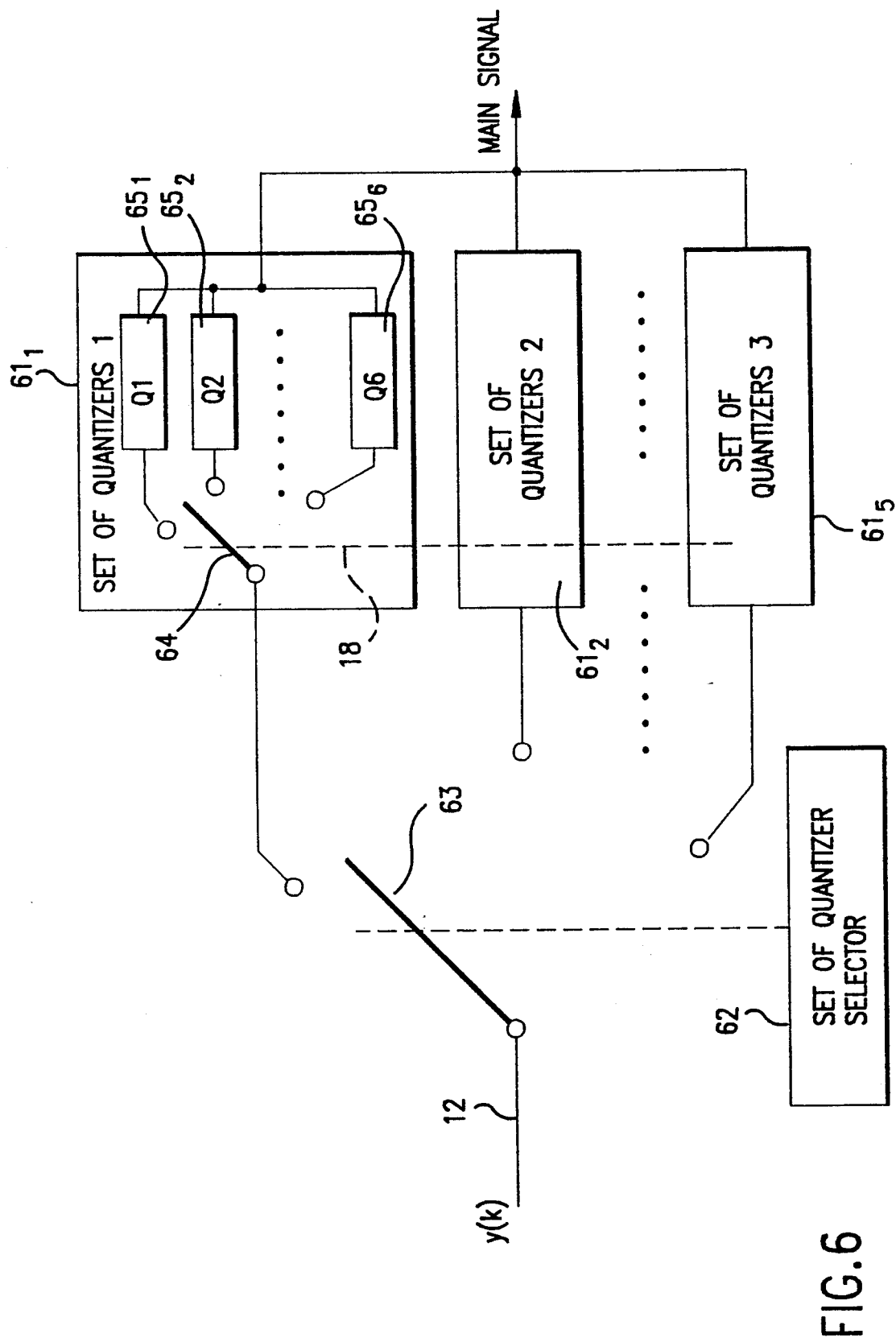
FIG. 6 shows a functional diagram of a module for selecting one among several quantizers.

According to the invention, and so as to optimize the coding system, several sets of quantizers are available, as a function of $N_{si}(j)$. FIG. 6 shows the functional diagram of the module for selecting the quantizer to be used.

For example, in the following configuration, five sets $61_1$ to $61_5$ of quantizers are available. A module 62 for testing the value $N_{si}(j)=1$ controls a selector 63 according to the following criteria:

the first set for bands having one non-zero coefficient: $N_{si}(j)=1$ the second set for: $N_{si}(j)=6$ the third set for: $6 > N_{si}(j) > 2$ the fourth set for: $10 > N_{si}(j) > 5$ the fifth set for: $N_{si}(j) > 9$.

In each case, optimum quantizers for a number of bits varying, for example, between 1 and 6 bits, has been computed. A second selector 64 enables a choice to be made, in each set of quantizers $65_1$ to $65_6$, of the optimal quantizer as a function of the number of bits R 18. Thus, the optimization of the choice of the quantizer is achieved as a function of the number of coefficients to be quantized and the number of bits allocated by the bit allocation module.

Figure 7:
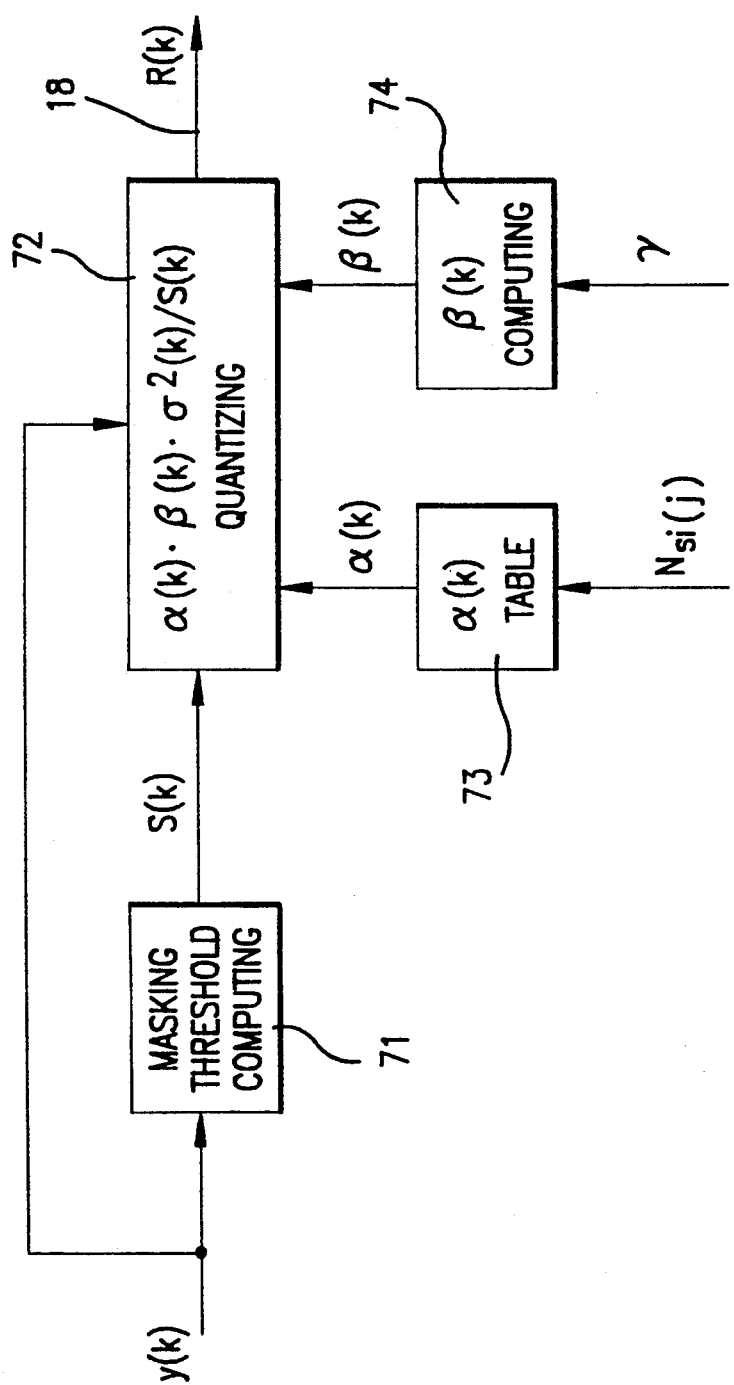
FIG. 7 is a functional diagram of a device for the allocation of bits to each band.

FIG. 7 shows the device for allocating bits to each band according to the invention.

The allocation of the bits is designed to accomplish the spectral shaping of the quantization noise according to perceptual criteria. It minimizes the noise to masking threshold ratio. This procedure is carried out at the decoder and is based on the spectrum descriptor transmitted beforehand.

The allocation of the bits includes a module for computing the masking threshold S(k) (this computation is similar to the one performed for the detection of the masked lines) and a module 72 for quantizing the ratio $\alpha(k).\beta(k).\sigma^2(k)/S(k)$ comparable to the one described by Yannick Mahieux in the article, "Transform Coding of Audio Signals Using Correlation Between Successive Transform Blocks" (Acts of the ICASSP Congress, Glasgow, 1989).

$\sigma^2(k)$ is the square of the spectrum descriptor, extended to all the coefficients y(k) of the band. It concerns the essential element of the ratio to be quantized. Since the coefficients are coded with different sets of quantizers (according to $N_{si}(j)$), it is necessary to include the relative performance values of each set of quantizers in the allocation of the bits, according to the work by Jayant and Noll, *Digital Coding of Waveforms* (Prentice Hall Signal Processing Series, 1984).

The function $\alpha(k)$ is equal to the performance factor of the quantizer to be used for the coefficient y(k). A table 73 includes, for example, five values of $\alpha(k)$ computed beforehand. This table is addressed by the number of non-zero coefficients. Taking account of the real performance values of the sets of quantizers enables a very appreciable improvement in the quality of the coding.

The module 74 for computing the function $\beta(k)$, for its part, takes account of the spectral spread $\gamma$, also according to Jayant and Noll. This function indicates whether the spectrum is concentrated or not, and is computed at the coder by:

$$\gamma = (1/N) \cdot \sum_{k=0}^{N-1} 10 \cdot \log_{10}(y^2(k)) - 10 \cdot \log_{10}\left((1/N) \sum_{k=0}^{N-1} y^2(k)\right)$$

For the allocation of the bits, $\gamma$ is computed in four frequency bands of equal width. These four values are transmitted to the decoder by means of a uniform quantization on 6 bits.

In each of these four frequency bands, the function $\beta(k)$ is computed according to the value of $\gamma$ by means of a non-linear function. The role of $\beta(k)$ is to force the allocation of the bits to grant a greater number of bits to the zones of the spectrum that contain peaks. Indeed, the coefficients y(k) corresponding to the pure sounds contained in the signal should be coded with higher precision, the masking threshold then having a level, as compared with that of the signal, that is lower than in the case of a noise spectrum.

The explicit detection of the inaudible spectral components, as well as the use of the inter-block correlation, enables a reduction in the bit rate of a high quality signal, with an original sampling frequency of over 32 kHz, at a value in the vicinity of 64 kbits/s, while at the same time preserving the quality of the original signal from a viewpoint of auditory results.

What is claimed is:

1. A device for the compression of a digital audio signal, designed to be transmitted through a channel with a limited bit rate or to be stored on a medium for storing digital information, comprising:

means for transform coding the digital audio signal into a transformed signal constituted by a plurality of spectral components, said spectral components being distributed among a plurality of adjacent critical bands covering the totality of the frequency spectrum of said transformed signal, said critical bands being representative of the sensibility of the human ear and being susceptible to include at least two spectral components;

means for eliminating inaudible spectral components from said plurality of spectral components, comprising:

means for processing a masking threshold corresponding to the human auditory system, said masking threshold being made of a plurality of threshold values, each threshold value corresponding to one of said spectral components, and means for eliminating spectral components which are below said masking threshold and for preserving spectral components which are upper said masking threshold:

means for quantizing said preserved spectral components; and means for allocating, for use by said means for quantizing, a specific number of bits for the quantization of the preserved spectral components within each said critical band, as a function of the number of spectral components preserved in each critical band.

2. A device for the compression of a digital audio signal, designed to be transmitted through a channel with a limited bit rate or to be stored on a medium for storing digital information, comprising;

means for transform coding the digital audio signal into a transformed signal constituted by a plurality of spectral components, said spectral components being distributed among a plurality of adjacent critical bands covering the totality of the frequency spectrum of said transformed signal, said critical bands being representative of the sensibility of the human ear and being susceptible to include at least two spectral components;

means for eliminating inaudible spectral components from said plurality of spectral components, comprising:

means for processing a masking threshold corresponding to the human auditory system, said masking threshold being made of the plurality of threshold values, each threshold value corresponding to one of said spectral components;

means for eliminating spectral components which are below said masking threshold and for preserving spectral components which are upper said masking threshold;

means for quantizing said preserved spectral components; and means for allocating, for use by said means for quantizing, a specific number of bits for the quantization of the preserved spectral components within each said critical band, as a function of the number of spectral components preserved in each critical band; and means for coding a piece of information representative of the preserved and masked spectral components comprising means for assigning a first binary value to an eliminated spectral component and a second binary value to a preserved spectral component, means for forming runs of a same of said binary values, by reading the binary value assigned to each of said spectral components in an order corresponding to ascending frequencies of said spectral components, and run length coding means for coding the length of said runs.

3. A device according to one of claims 1 or 2, wherein said masking threshold is computed according to Zwicker's psychoauditive masking criterion.

4. A device according to one of claims 1 or 2, wherein said means for quantizing include at least two distinct quantizers and means for selective assigning of one of said quantizers to each of said critical bands, said means for selective assigning assigning one of said quantizers to one of said critical bands as a function of the number of spectral components preserved in said critical band.

5. A device according to one of claims 1 or 2, wherein said bit allocating means comprises means for minimizing a quantization noise-to-masking threshold ratio in each of said critical bands.

6. A device according to claim 5, wherein said quantization noise is determined as a function of a piece of information selected from three pieces of information belonging to the group including:

mean square deviation of said preserved spectral components in said critical band;

a performance factor of the quantizer selected for said critical band;

a piece of information on the spectral spread of said critical band.

7. A device according to one of claims 1 or 2, comprising means for coding a piece of information representative of the preserved and masked spectral components comprising:

means for assigning a first binary value to an eliminated spectral component and a second binary value to a preserved spectral component, means for forming runs of a same of said binary values, by reading the binary value assigned to each of said spectral components in an order corresponding to ascending frequencies of said spectral components run length coding means for coding the length of said runs.

8. A device according to claim 7, wherein said run length coding means use a variable length code of the Huffman codes type.

9. A device according to claim 7, wherein said run length coding means deliver a specific code word for the coding of a critical band in which all said spectral components are eliminated.

10. A device according to claim 7, wherein said run length coding means cooperate with means for computing the bit rate gain provided by said run length coding, and selection means for activating said run length coding means, as a function of a piece of information delivered by said means for computing the bit rate gain.

11. A device according to one of claims 1 or 2, comprising means for coding an auxiliary information corresponding to a description of the frequency spectrum covered by said spectral components.

12. A device according to claim 11, wherein said means for coding an auxiliary information include predictive coding means.

13. A device according to claim 11, wherein said means for coding an auxiliary information include means selected from the group comprising a logarithmic converter, a differential MIC encoder and means for coding by variable length codes of the Huffman codes type.

14. A device according to claim 12, wherein said coding means also include means for inter-block coding without memory and means for the selecting either of said predictive coding means or said means for coding without memory according to a pre-determined criterion.

15. A device according to claim 14, wherein said pre-determined criterion takes into account at least one of the criteria belonging to the group including a least bit rate criterion and a criterion of minimizing the effect of transmission errors.

16. A device according to one of claims 1 or 2, wherein at least one of the pieces of information belonging to a group including said auxiliary information corresponding to a description of the spectrum, said information representative of the preserved spectral components to be quantized and a piece of information on spectral spread, is transmitted or stored jointly at the quantized spectral components.

17. A device according to one of claims 1 or 2, wherein said means for transforming uses a Princen and Bradley type of modified discrete cosine transform.

18. A device according to claim 17, wherein said means for transforming includes means for windowing a temporal signal feeding said means for transforming, bringing out a symmetry in said transformed signal.

19. A device according to claim 18, wherein said means for windowing use a window defined by:

$$F(n) = 2 \cdot \sin(\pi(n + 0.5)/N)$$
$$n = 0, \ldots, N - 1$$

where N is the number of samples of said window.

* * * * *

UNITED STATES PATENT AND TRADEMARK OFFICE
CERTIFICATE OF CORRECTION

Page 1 of 2

PATENT NO. : 5,185,800
DATED : February 9, 1993
INVENTOR(S) : Yannick Mahieux

It is certified that error appears in the above-indentified patent and that said Letters Patent is hereby corrected as shown below:

| Column | Line | |
|---|---|---|
| 4 | 41 | After "spread" insert --,--. |
| 4 | 48 | Change "cluding" to --cludes--. |
| 5 | 1 | After "of" insert --a--. |
| 5 | 4 | Change "the" to --a--. |
| 6 | 43 | After "spread" delete --,--. |
| 6 | 68 | Change "is" (first occurrence) to --are--. |
| 7 | 25 | Change "b(j)" to --$b_h(j)$--. |
| 7 | 41 | Change "$s^k{}_{in}(i)$" to --$s_{in}{}^k(i)$--. |
| 7 | 53 | Change "$s_{out}j$" to --$s_{out}{}^j$--. |
| 7 | 58 | Change "$s^j{}_{out}(i)$" to --$s_{out}{}^j(i)$--. |
| 7 | 66 | Change "$s^j{}_{out}(i)$" to --$s_{out}{}^j(i)$--. |
| 9 | 18 | Change "1" (figure) to --l-- (letter). |
| 9 | 53 | Change "$b^h{}_{si}(j)$" to --$b_{si}{}^h(j)$--. |
| 9 | 55 | Change "$b^b{}_{si}(j)$" to --$b_{si}{}^b(j)$--. |

UNITED STATES PATENT AND TRADEMARK OFFICE
CERTIFICATE OF CORRECTION

PATENT NO. : 5,185,800
DATED : February 9, 1993
INVENTOR(S) : Yannick Mahieux

It is certified that error appears in the above-indentified patent and that said Letters Patent is hereby corrected as shown below:

| Column | Line | |
|--------|------|---|
| 10 | 14 | Delete "to" (second occurrence). |
| 10 | 66 | Change "frequentially" to --according to frequency--. |
| 11 | 9 | After "for" delete --94--. |
| 13 | 20 | Change "upper" to --above--. |
| 13 | 53 | Change "upper" to --above--. |
| 14 | 14 | Delete "assigning" (second occurrence). |

Signed and Sealed this

Fifth Day of April, 1994

Attest:

BRUCE LEHMAN

Attesting Officer

Commissioner of Patents and Trademarks